US012608563B2

(12) United States Patent
Eisenstadt et al.

(10) Patent No.: US 12,608,563 B2
(45) Date of Patent: Apr. 21, 2026

(54) GUIDED DYNAMIC CONSTRUCTION OF LARGE LANGUAGE MODEL (LLM) PROMPTS

(71) Applicant: Microsoft Technology Licensing, LLC, Redmond, WA (US)

(72) Inventors: Roy Eisenstadt, Tel Aviv (IL); Abed El Kader Asi, Sammamish, WA (US); Bar Segal, Tel Aviv (IL); Eyal Zach, Tel Aviv (IL); Royi Ronen, Tel Aviv (IL)

(73) Assignee: Microsoft Technology Licensing, LLC., Redmond, WA (US)

( * ) Notice: Subject to any disclaimer, the term of this patent is extended or adjusted under 35 U.S.C. 154(b) by 183 days.

(21) Appl. No.: 18/515,246

(22) Filed: Nov. 20, 2023

(65) Prior Publication Data

US 2025/0165721 A1     May 22, 2025

(51) Int. Cl.
*G06F 40/40*         (2020.01)
*G06F 40/103*       (2020.01)

(52) U.S. Cl.
CPC ............ *G06F 40/40* (2020.01); *G06F 40/103* (2020.01)

(58) Field of Classification Search
CPC ............................... G06F 40/40; G06F 40/103
See application file for complete search history.

(56) References Cited

U.S. PATENT DOCUMENTS

| | | | |
|---|---|---|---|
| 2023/0101224 A1* | 3/2023 | Singh ...................... | G06N 3/08 |
| | | | 707/770 |
| 2023/0124288 A1* | 4/2023 | Meier-Hellstern ... | G06N 3/0455 |
| | | | 706/12 |
| 2024/0256762 A1* | 8/2024 | Beauchamp .......... | G06F 40/166 |
| 2024/0356870 A1* | 10/2024 | Bouguerra ......... | G06Q 10/1095 |
| 2024/0403569 A1* | 12/2024 | Berglund ............... | G06F 40/40 |

* cited by examiner

*Primary Examiner* — Mahelet Shiberou
(74) *Attorney, Agent, or Firm* — Foley IP Law, PLLC

(57) ABSTRACT

Example solutions for reducing the likelihood of hallucinations by large language models (LLMs) and improving the relevance of generated text are disclosed. A set of multiple of machine learning (ML) models, each custom-trained to identify a different specific topic within text, dynamically generate multiple topic-specific prompts from a received email in an email thread. A user, responding to the prompts, produces material that is used in conjunction with customer relations management (CRM) data and enterprise suite data (e.g., calendar/schedule information) to dynamically generate an LLM prompt. An LLM, using the prompt, generates output text suitable for a business correspondence, such as a reply email, to the sender of the email. The combination of the responses to the multiple topic-specific prompts and the CRM and enterprise suite data in the LLM prompt both ensures relevance of the reply correspondence and minimizes the risk of hallucinations.

20 Claims, 7 Drawing Sheets

Hi Roy,

We previously talked about us wanting to make a purchase of 4 machines with this quarter's budget. You mentioned that you will circle back to me regarding a price reduction and the arrival date of your shipment. Do you have any news or time for a call this week?

Nancy

FIG. 5

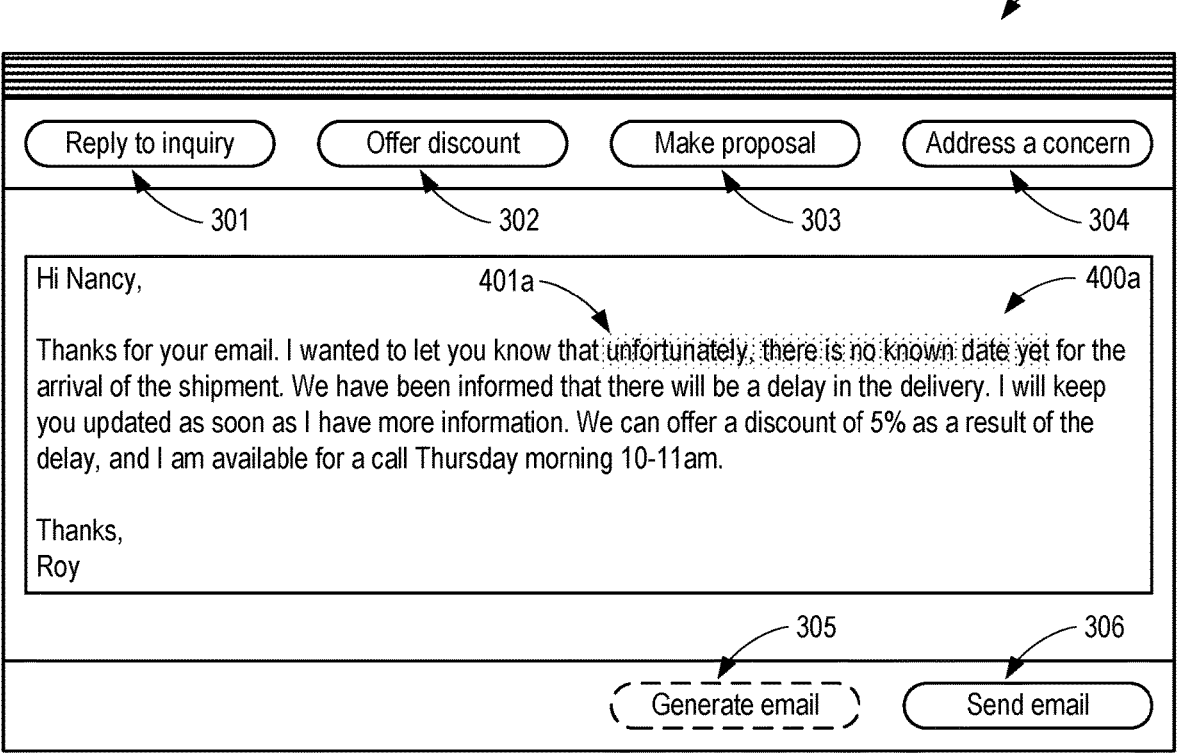

300

Reply to inquiry     Offer discount     Make proposal     Address a concern 301     302     303     304

Hi Nancy,     401a     400a

Thanks for your email. I wanted to let you know that unfortunately, there is no known date yet for the arrival of the shipment. We have been informed that there will be a delay in the delivery. I will keep you updated as soon as I have more information. We can offer a discount of 5% as a result of the delay, and I am available for a call Thursday morning 10-11am.

Thanks,
Roy 305     306

Generate email     Send email

FIG. 6

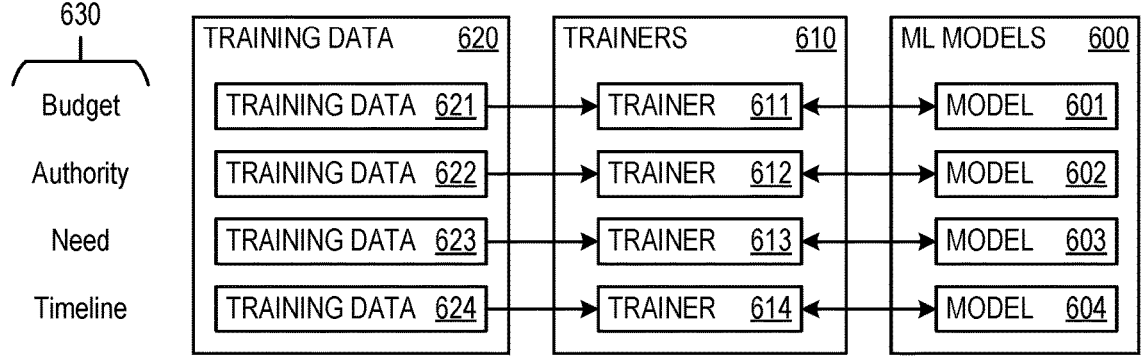

630

Budget

Authority

Need

Timeline

| TRAINING DATA 620 | TRAINERS 610 | ML MODELS 600 |
|---|---|---|
| TRAINING DATA 621 | TRAINER 611 | MODEL 601 |
| TRAINING DATA 622 | TRAINER 612 | MODEL 602 |
| TRAINING DATA 623 | TRAINER 613 | MODEL 603 |
| TRAINING DATA 624 | TRAINER 614 | MODEL 604 |

FIG. 8

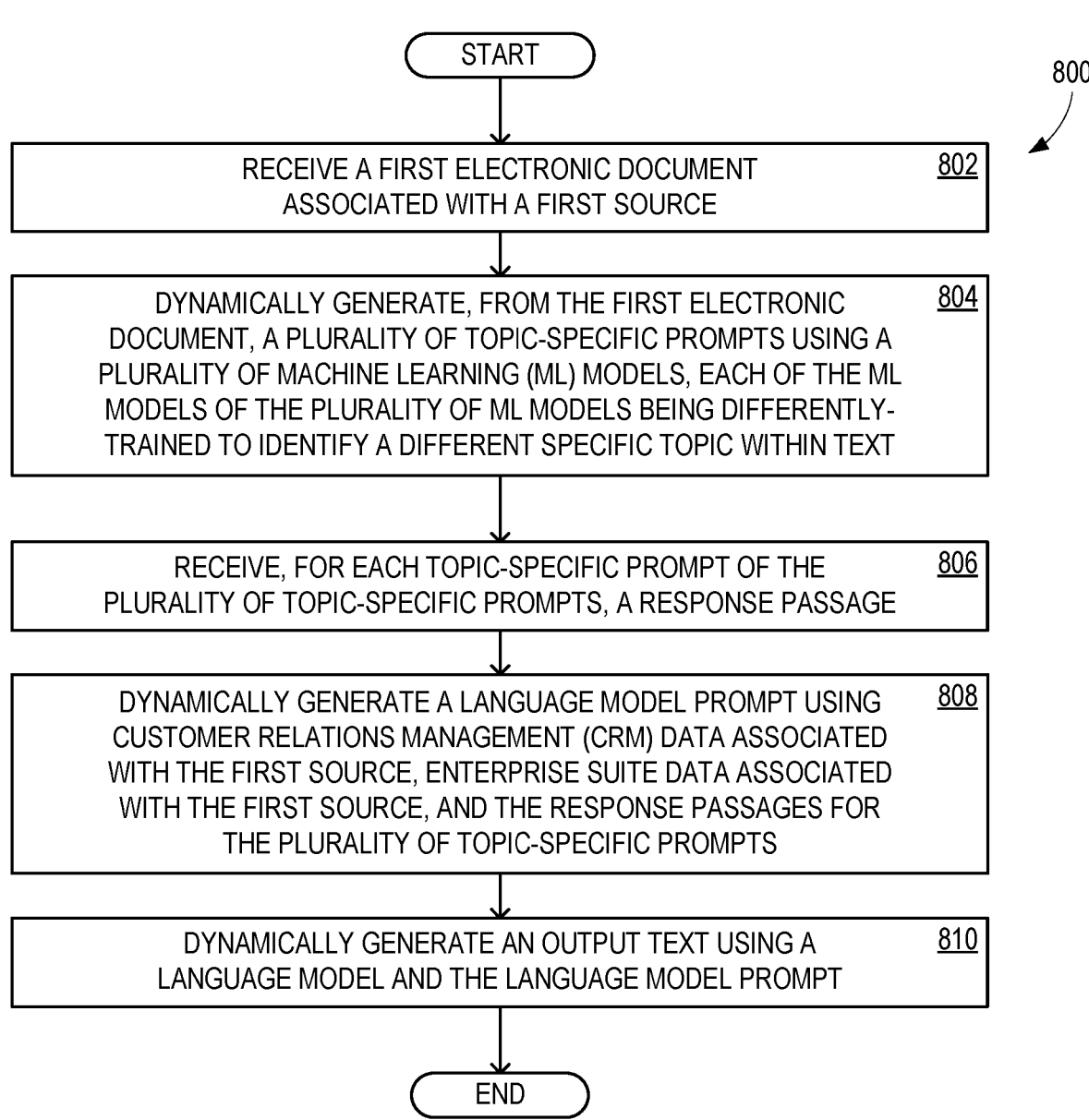

START

800

RECEIVE A FIRST ELECTRONIC DOCUMENT
ASSOCIATED WITH A FIRST SOURCE     802

DYNAMICALLY GENERATE, FROM THE FIRST ELECTRONIC     804
DOCUMENT, A PLURALITY OF TOPIC-SPECIFIC PROMPTS USING A
PLURALITY OF MACHINE LEARNING (ML) MODELS, EACH OF THE ML
MODELS OF THE PLURALITY OF ML MODELS BEING DIFFERENTLY-
TRAINED TO IDENTIFY A DIFFERENT SPECIFIC TOPIC WITHIN TEXT

RECEIVE, FOR EACH TOPIC-SPECIFIC PROMPT OF THE     806
PLURALITY OF TOPIC-SPECIFIC PROMPTS, A RESPONSE PASSAGE

DYNAMICALLY GENERATE A LANGUAGE MODEL PROMPT USING     808
CUSTOMER RELATIONS MANAGEMENT (CRM) DATA ASSOCIATED
WITH THE FIRST SOURCE, ENTERPRISE SUITE DATA ASSOCIATED
WITH THE FIRST SOURCE, AND THE RESPONSE PASSAGES FOR
THE PLURALITY OF TOPIC-SPECIFIC PROMPTS

DYNAMICALLY GENERATE AN OUTPUT TEXT USING A     810
LANGUAGE MODEL AND THE LANGUAGE MODEL PROMPT

END

Figure 9:
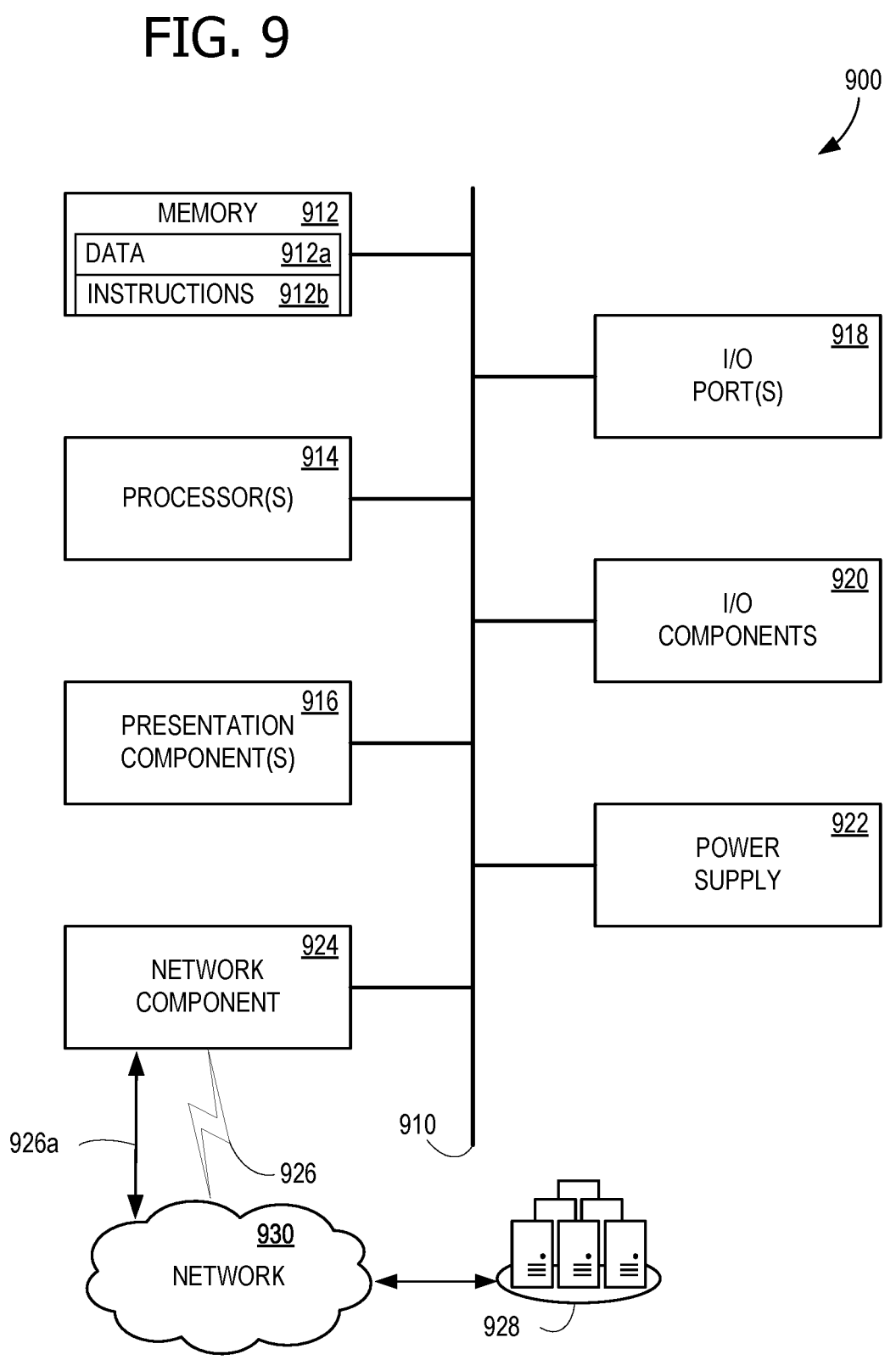

MEMORY          912
DATA          912a
INSTRUCTIONS          912b

PROCESSOR(S)          914

PRESENTATION          916
COMPONENT(S)

NETWORK          924
COMPONENT

I/O          918
PORT(S)

I/O          920
COMPONENTS

POWER          922
SUPPLY

926a

926

910

930
NETWORK

928

GUIDED DYNAMIC CONSTRUCTION OF LARGE LANGUAGE MODEL (LLM) PROMPTS

BACKGROUND

A generative pre-trained transformer (GPT), such as GPT-3 and GPT-4, is a form of artificial intelligence (AI), within a set of machine learning (ML) models known as large language models (LLMs). An LLM is typically a deep learning model, comprising a neural network having a parameter count in the billions, and trained to predict the next word in a sentence. This permits LLMs, when given a context, to generate text that is similar to human-authored text. Current versions, such as GPT-4, are able to generate text as a response or reply to a statement or question written by a human.

Unfortunately however, LLMs may hallucinate and may also miss some cues regarding all of the relevant issues to address. A hallucination is a confident response by an AI entity, such as an LLM, that is not justified by its training data, and may involve the fabrication of purported facts. When generating text to be consumed in a business setting, the fabrication of facts may be problematic, deterring the use of LLMs for some applications. Additionally, the possibility of the LLM overlooking issues of importance provides a further deterrent to their use for some applications.

SUMMARY

The disclosed examples are described in detail below with reference to the accompanying drawing figures listed below. The following summary is provided to illustrate some examples disclosed herein.

Example solutions for performing guided dynamic construction of large language model prompts include: dynamically generating, from the first electronic document, a plurality of topic-specific prompts using a plurality of machine learning (ML) models, each of the ML models of the plurality of ML models being differently-trained to identify a different specific topic within text; receiving, for each topic-specific prompt of the plurality of topic-specific prompts, a response passage; dynamically generating a language model prompt using customer relations management (CRM) data associated with the first source, enterprise suite data associated with the first source, and the response passages for the plurality of topic-specific prompts; and dynamically generating an output text using a language model and the language model prompt.

BRIEF DESCRIPTION OF THE DRAWINGS

The disclosed examples are described in detail below with reference to the accompanying drawing figures listed below:

FIG. 5 illustrates an alternative exemplary output text that may be generated when using in the example architecture of FIG. 1, in response to different user input than used to generate the exemplary output text of FIG. 4A;

FIG. 6 illustrates an exemplary training scheme that trains a plurality of multi modal (MM) or machine learning (ML) models on a plurality of different topics that may be found within the exemplary electronic document of FIG. 2;

FIGS. 7 and 8 show flowcharts illustrating exemplary operations that may be performed when using example architectures, such as the architecture of FIG. 1; and FIG. 9 shows a block diagram of an example computing device suitable for implementing some of the various examples disclosed herein.

Corresponding reference characters indicate corresponding parts throughout the drawings.

DETAILED DESCRIPTION

Example solutions for reducing the likelihood of hallucinations by large language models (LLMs) and improving the relevance of generated text are disclosed. A set of multiple of machine learning (ML) models, each custom-trained to identify a different specific topic within text, dynamically generate multiple topic-specific prompts from a received email in an email thread. A user, responding to the prompts, produces material that is used in conjunction with customer relations management (CRM) data and enterprise suite data (e.g., calendar/schedule information) to dynamically generate an LLM prompt. An LLM, using the prompt, generates output text suitable for a business correspondence, such as a reply email, to the sender of the email. The combination of the responses to the multiple topic-specific prompts and the CRM and enterprise suite data in the LLM prompt both ensures relevance of the reply correspondence and minimizes the risk of hallucinations.

Aspects of the disclosure advance the art of prompt engineering, reducing cognitive load for users and thus improving the human/computer interaction. Examples enable language models to be used in a wider range of settings, in which fabrication of facts and omission of relevant topics are problematic, all while reducing the need for a human labor (e.g., authoring electronic documents from scratch, or heavily scrutinizing and editing automatically generated electronic documents). These advantageous operations are accomplished, at least in part, by dynamically generating, from the first electronic document, a plurality of topic-specific prompts using a plurality of machine learning (ML) models or multimodal models (MMs), each of the models being differently-trained to identify a different specific topic within text. As used herein ML, includes artificial intelligence (AI).

Various examples will be described in detail with reference to the accompanying drawings. Wherever preferable, the same reference numbers will be used throughout the drawings to refer to the same or like parts. References made throughout this disclosure relating to specific examples and implementations are provided solely for illustrative purposes but, unless indicated to the contrary, are not meant to limit all examples.

Figure 1:
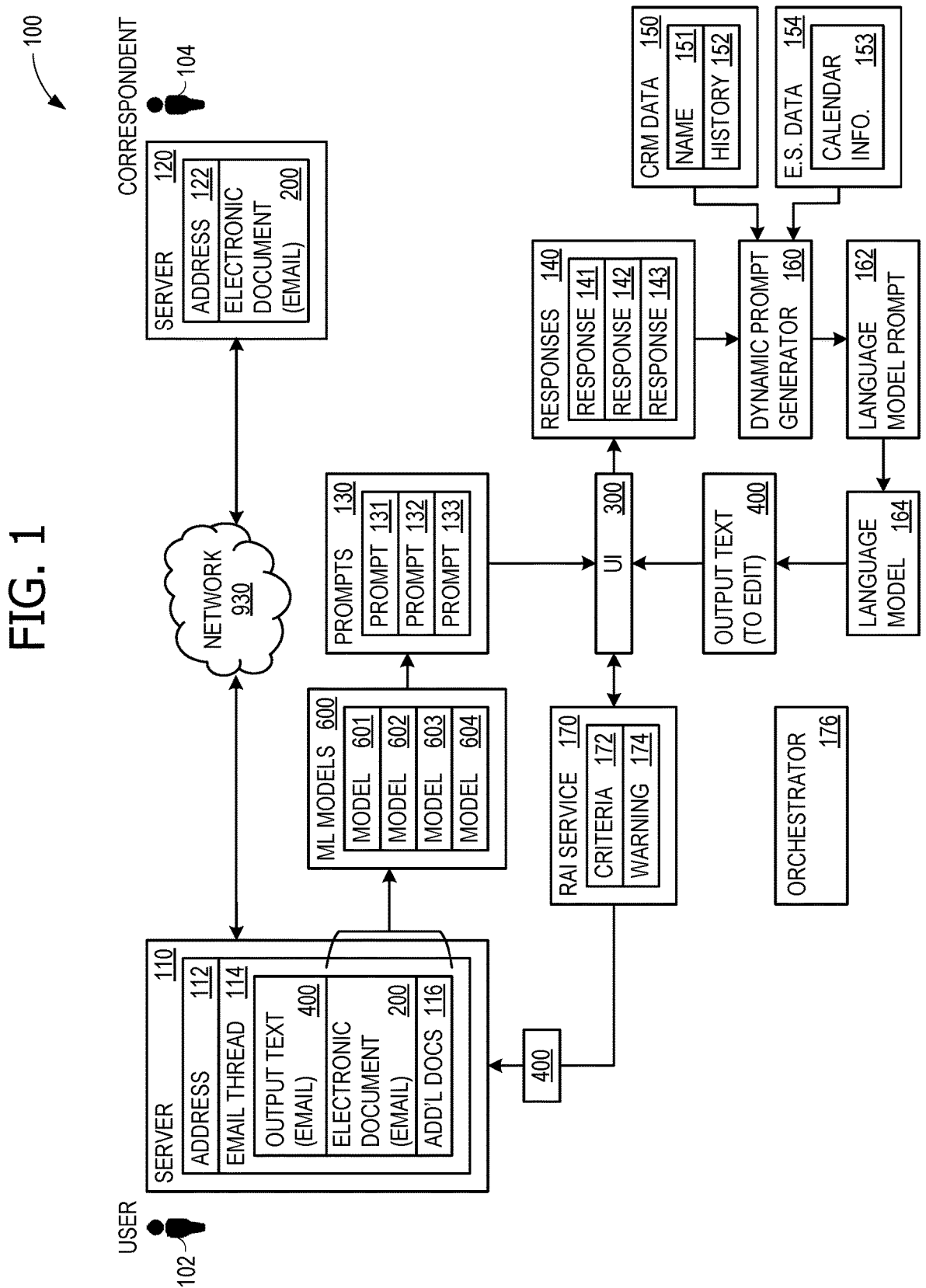
FIG. 1 illustrates an example architecture that provides for guided dynamic construction of large language model prompts.
Figure 2:
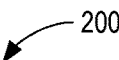
FIG. 2 illustrates an exemplary electronic document (e.g., email), such as may be processed using the example architecture of FIG. 1.

FIG. 1 illustrates an example architecture 100 that provides for guided dynamic construction of LLM prompts. A user 102 uses architecture 100 to reply to a correspondent 104, for example in an exchange of emails across a computer network 930 (which is shown in further detail in FIG. 9). Correspondent 104 writes an email, an electronic document 200, and sends it from an email server 120, using an email account with an email address (a source 122 of electronic document 200), across computer network 930 to an email account having an email address 112 for user 102 on an email server 110. An example of electronic document 200 is shown in FIG. 2.

Email server 110 adds electronic document 200 to an email thread 114, which has prior emails shown as additional associated electronic documents 116. Using architecture 100, an output text 400 is generated as a reply email and transmitted back across computer network 930, from email server 110 (using email address 112 for user 102) to source 122 (e.g., the email address of correspondent 104) at email server 120. Email server 110 also then adds output text 400 to email thread 114. Although electronic document 200, additional associated electronic documents 116, and output text 400 are described in the context of email, it should be understood that other forms of electronic documents may be used, and other exchange mechanisms (other than email) may instead be used for electronic document 200, additional associated electronic documents 116, and output text 400.

An orchestrator 176 manages the generation, editing, vetting, and transmission of output text 400 using the various components of architecture 100, although other forms of management may also be used in some examples. Electronic document 200, either alone, or along with additional associated electronic documents 116 (i.e., the content of email thread 114 prior to the addition of output text 400), is sent by orchestrator 176 to a plurality of ML models 600. Plurality of ML models 600 contains an ML model 601, an ML model 602, an ML model 603, and an ML model 604, each of which has been differently-trained to identify a different specific topic within text. This is illustrated in further detail in relation to FIG. 6.

Examples of the different topics include budget, authority, need, and timeline (BANT) topics in a commercial sales setting. Different topics may be used in other settings, such as medical, academic, and various technology fields. Although examples are described using ML models, it should be understood that MM models may be substituted for ML models 601-602. Although four ML models are illustrated, some examples may use a different number.

Plurality of ML models 600 generates a plurality of topic-specific prompts 130 from electronic document 200. Plurality of topic-specific prompts 130 includes a topic-specific prompt 131, a topic-specific prompt 132, and a topic-specific prompt 133. In general, there is no need for the count of plurality of topic-specific prompts 130 to match the count of plurality of ML models 600. Based on the topics included and the content of electronic document 200 (and additional associated electronic documents 116), some ML models may generate more than just a single topic-specific prompt, and some ML models may not generate any topic-specific prompt.

Figure 3:
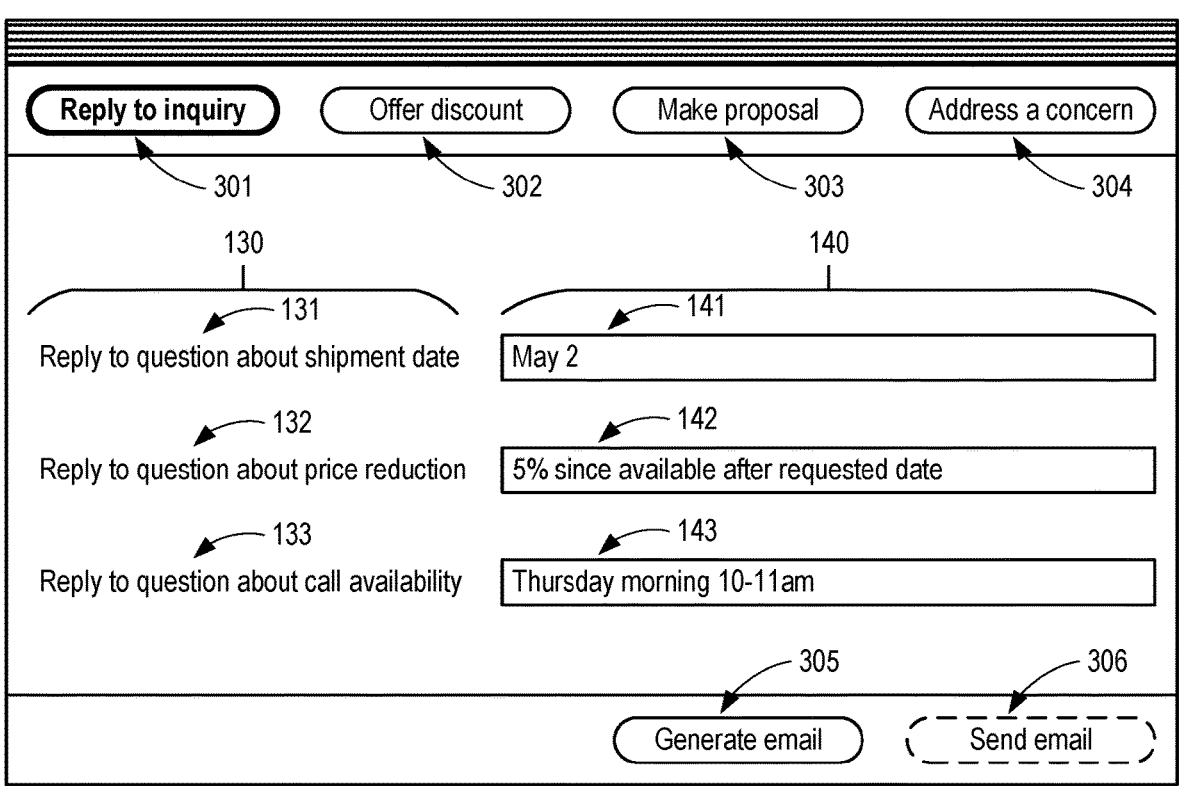
FIG. 3 illustrates an exemplary user interface (UI), such as may be used in the example architecture of FIG. 1.

Plurality of topic-specific prompts 130 are provided to a user interface (UI) 300, and user 102 enters plurality of response passages 140 into UI 300, as shown in FIG. 3. Plurality of response passages 140 includes a response passage 141 providing information relevant to topic-specific prompt 131, a response passage 142 providing information relevant to topic-specific prompt 132, and a response passage 143 providing information relevant to topic-specific prompt 133.

A language model prompt generator 160 uses plurality of response passages 140 along with other information relevant to correspondent 104, such as CRM data 150, and information relevant to user 102, such as enterprise suite data 154, to generate a language model prompt 162 (which may be an LLM prompt, in some examples). CRM data 150 includes a name 151 of correspondent 104, a history 152 of interactions with correspondent 104, such as prior purchases, and other information. Enterprise suite data 154 may include calendar information 153 for user 102 to identify scheduling availability and conflicts information and/or other data files available from an office productivity software suite. In some examples, language model prompt generator 160 is an ML model or MM.

Figure 4A:
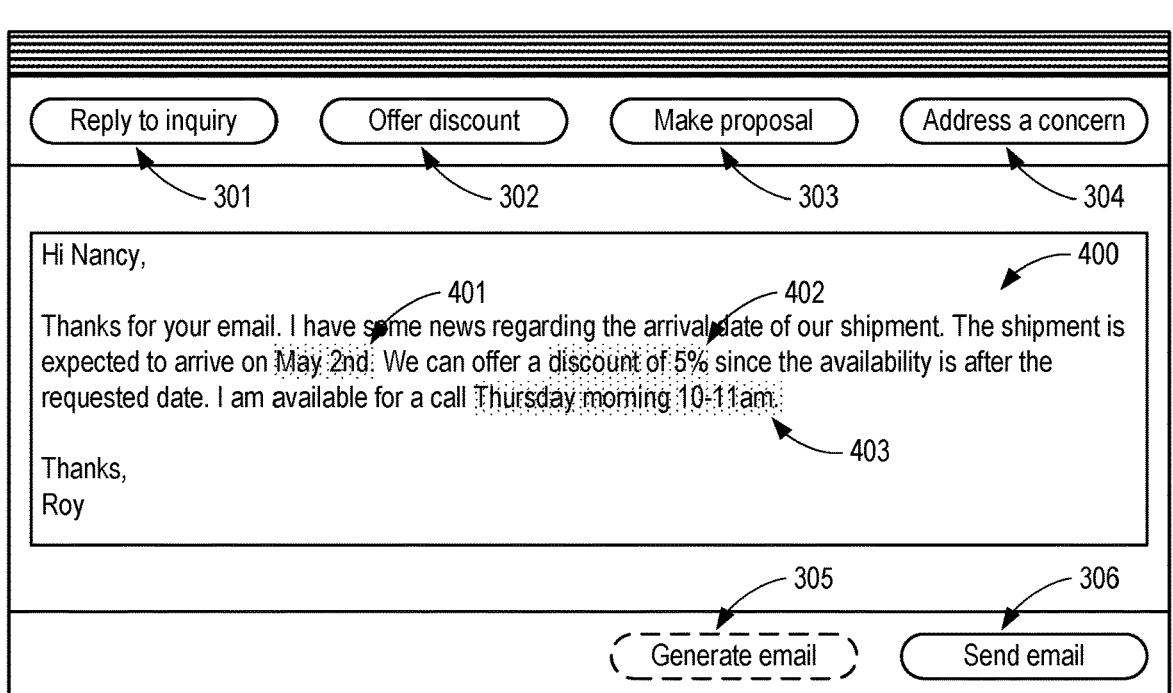
FIG. 4A illustrates an exemplary output text that may be generated when using in the example architecture of FIG. 1.

Language model prompt 162 is provided to a language model 164 that generates output text 400. Language model 164 may be an LLM or a multimodal large language model (MMLLM)), and in some examples comprises GPT-4, chatGPT, or an equivalent. Orchestrator 176 routes output text 400 to UI 300, as shown in FIGS. 4A-5, where user 102 is able to make final edits. Orchestrator 176 then routes output text 400 to a responsible AI (RAI) service 170, which assesses output text 400 to verify that it satisfies (passes) RAI criteria 172. If not, RAI service 170 returns an RAI warning message 174 to user 102 via UI 300. Otherwise, if RAI criteria 172 are satisfied, orchestrator 176 routes output text 400 to email server 110, which adds output text 400 to email thread 114 and transmits output text 400 across computer network 930 to source 122 (e.g., the email address of correspondent 104) as a reply email message (i.e., a reply to electronic document 200).

FIG. 2 illustrates an example of electronic document 200, which mentions "wanting to make a purchase of 4 machines", and requests information "regarding a discount and the arrival date of your shipment" and also availability for another conversation. Electronic document 200 identifies user 102 as Roy, and also identifies correspondent 104 as Nancy.

FIG. 3 illustrates an example display of UI 300. UI 300 offers several classes of automatic document generation, indicated by a reply to inquiry selection 301, an offer discount selection 302, a make proposal selection 303, and an address a concern selection 304. Each selection produces a different class of language model prompt 162. The available selections are tied to various training-based capabilities of language model prompt generator 160.

As indicated by the bold font and heavier line, user 102 has clicked on (selected) reply to inquiry selection 301, triggering plurality of ML models 600 to generate plurality of topic-specific prompts 130 from electronic document 200. Plurality of topic-specific prompts 130 has topic-specific prompt 131 as "Reply to question about shipping date", which is a timeline topic, topic-specific prompt 132 as "Reply to question about price reduction", which is a budget topic, and topic-specific prompt 133 as "Reply to question about call availability", which is another timeline topic.

Plurality of response passages 140 has response passage 141 as "May 2" for topic-specific prompt 131, response passage 142 as "5% since available after requested date" for topic-specific prompt 132, and response passage 143 as "Thursday morning 10-11 am" for topic-specific prompt 133. This information is available from user 102, but may not be easily-located by an automated system and/or may not be available in the other data sources used by language model prompt generator 160 (e.g., CRM data 150 and enterprise suite data 154). Without the information provided by user 102 in response to plurality of topic-specific prompts 130, there is a risk that language model 164 will hallucinate and that language model prompt generator 160 will miss an issue raised in electronic document 200.

As shown in FIG. 3, a generate email button 305 is active and available for user 102 to click, whereas a send email button 306 is not active. This is because, at this stage of the process, output text 400 has not yet been generated. When user 102 clicks generate email button 305, orchestrator 176 tasks language model prompt generator 160 to generate language model prompt 162 and then tasks language model 164 to generate output text 400. However, at the stage of the process indicated in FIG. 3, output text 400 is not yet available for sending as an email. Thus, to avoid confusing user 102, send email button 306 is not active. After user 102 clicks generate email button 305, this changes, and an example result is shown in FIGS. 4A and 4B.

FIG. 4A illustrates UI 300 at a later time, after language model 164 has generated output text 400. Send email button 306 is not active, however user 102 will be editing output text 400 prior to sending output text 400 as an email to correspondent 104. Output text 400 is formatted as a correspondence from user 102 (Roy) to correspondent 104 (Nancy), and has annotations to enable user 102 to verify the source of various information elements. For example, an annotation 401 is shown as highlighting of "May 2nd", which is information that user 102 may wish to verify. Another annotation 402 is shown as highlighting of "discount of 5%", and another annotation 403 is shown as highlighting of "Thursday morning 10-11 am."

The annotations are available when there is traceability of critical information to specific input sources. The highlighting brings the attention of a human user, such as user 102 information elements for which the user may wish to verify the accuracy and/or source. In some examples, different annotations are used. In some examples, highlighting annotations are color coded according to the specific input source from which language model prompt generator 160 retrieved the information. The various input sources include topic-specific prompts 131-133, CRM data 150, enterprise suite data 154, electronic document 200, and additional associated electronic documents 116.

Figure 4B:
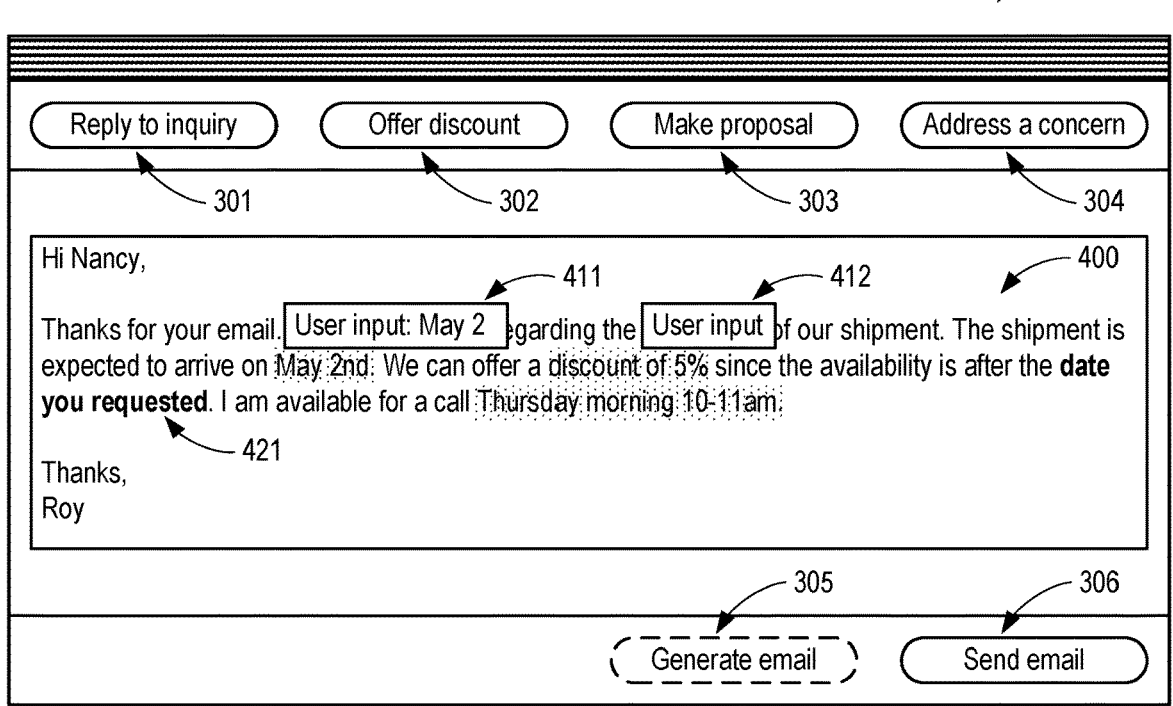
FIG. 4B illustrates the exemplary output text of FIG. 4A when a user interacts with elements of the exemplary UI of FIG. 3.

FIG. 4B illustrates UI 300 after user 102 clicks annotation 401 (i.e., selects, such as with an input device like a mouse or touchscreen). A display 411 shows at least a portion of the associated input source (response passage 141 as "May 2"). FIG. 4B also illustrates UI 300 after user 102 clicks annotation 402 An identification 412 shows the associated input source (response passage 142). In some examples, display 411 and identification 412 are not visible within UI 300 simultaneously, but sequentially. Also shown in FIG. 4B is an edit 421 received from user 102, in which user 102 replaces "requested date" with "date you requested."

FIG. 5 illustrates an alternative exemplary output text 400a that may be generated when response passage 141 as is "delay, no known date yet", rather than "May 2." Output text 400a states "I wanted to let you know that unfortunately, there is no known date yet for the arrival of the shipment" in place of "I have some news regarding the arrival date of our shipment. The shipment is expected to arrive on May 2nd." An annotation 401a provides traceability for "unfortunately, there is no known date yet" to response passage 141.

FIG. 6 illustrates an exemplary training scheme that trains plurality of ML models 600 on a plurality of different specific topics 630 reflected in a training data set 620. A plurality of trainers 610 includes a trainer 611 that trains ML model 601 using training data 621, a trainer 612 that trains ML model 602 using training data 622, a trainer 613 that trains ML model 603 using training data 623, and a trainer 614 that trains ML model 604 using training data 624. Training data 621-624 are within training data set 620. As indicated, plurality of different specific topics 630 includes BANT topics, with budget in training data 621, authority in training data 622, need in training data 623, and timeline in training data 624. In some examples, supervised training is used.

Figure 7:
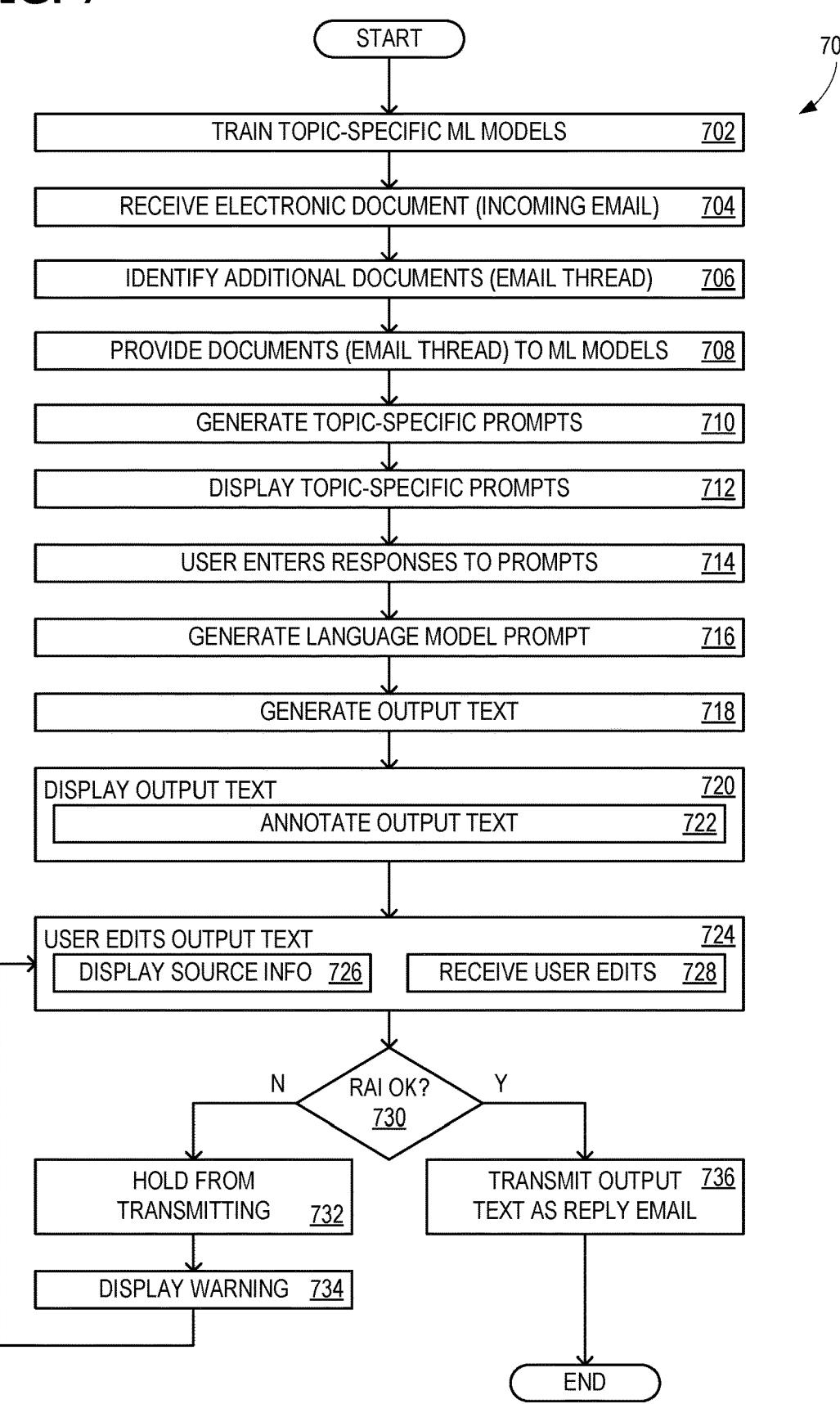

FIG. 7 shows a flowchart 700 illustrating exemplary operations that may be performed by architecture 100 for guided dynamic construction of large language model prompts. In some examples, operations described for flowchart 700 are performed by computing device 900 of FIG. 9. Flowchart 700 commences with training each of ML models 601-602 to identify a different specific topic (within text) of plurality of different specific topics 630, in operation 702.

Electronic document 200 is received in operation 704, and is associated with a source 122 (e.g., the email address of correspondent 104). Operation 706 identifies additional associated electronic documents 116 that are associated with electronic document 200, such as other emails in email thread 114. Electronic document 200 is provided to plurality of ML models 600 in operation 708, along with additional associated electronic documents 116, in some examples.

In operation 710, plurality of ML models 600 dynamically generates plurality of topic-specific prompts 130 from electronic document 200 (and additional associated electronic documents 116, in some examples). Operation 712 displays plurality of topic-specific prompts 130 in UI 300, and UI 300 receives a response passage (e.g., response passages 141-143) from user 102 for each topic-specific prompt 131-133 in operation 714. In operation 716, language model prompt generator 160 dynamically generates language model prompt 162 using CRM data 150 associated with source 122 (the email address of correspondent 104), enterprise suite data 154 associated with the email address of correspondent 104) (via association with source 122), and response passages 141-143. Other data sources may also be used, such as electronic document 200 and additional associated electronic documents 116.

Operation 718 dynamically generates output text 400 using language model 164 and language model prompt 162 (e.g., language model 164 operating on language model prompt 162). Output text 400 is displayed in UI 300 in operation 720. Operation 722, which may be included within operation 722, annotates output text 400 to indicate elements in output text 400 having traceability to an associated input source. In some examples, annotating output text 400 comprises highlighting the elements in output text 400 with differing colors, with each of the differing colors of the highlighting corresponding to a category of the associated input source.

User 102 edits output text 400 in operation 724, which includes operations 726 and 728. Operation 726 displays at least a portion of the associated input source (e.g., display 411) or an identification (e.g., identification 412) of the associated input source, based on at least receiving a selection of an annotation of output text 400 in UI 300. Actual edits (e.g., edit 421) are received to output text 400 through UI 300 in operation 728.

Decision operation 730 determines whether output text 400 passes RAI criteria 172, prior to transmitting output text 400 across computer network 930. If not, operation 732 prevents transmitting output text 400 until output text 400 is changed to passing RAI criteria 172. Operation 734 displays warning message 174, and flowchart 700 either terminates or returns to operation 724 for user 102 to amend output text 400.

However, if decision operation 730 verifies that output text 400 passes RAI criteria 172, operation 736 transmits output text 400 across computer network 930 to source 122

(e.g., as a an email message to the email address of correspondent 104). In some examples, output text 400 extends email thread 114.

FIG. 8 shows a flowchart 800 illustrating exemplary operations that may be performed by architecture 100. In some examples, operations described for flowchart 800 are performed by computing device 900 of FIG. 9. Flowchart 800 commences with operation 802, which includes receiving a first electronic document associated with a first source across a computer network. Operation 804 includes dynamically generating, from the first electronic document, a plurality of topic-specific prompts using a plurality of ML models, each of the ML models of the plurality of ML models being differently-trained to identify a different specific topic within text.

Operation 806 includes receiving, for each topic-specific prompt of the plurality of topic-specific prompts, a response passage. Operation 808 includes dynamically generating a language model prompt using CRM data associated with the first source, enterprise suite data associated with the first source, and the response passages for the plurality of topic-specific prompts. Operation 810 includes dynamically generating an output text using a language model and the language model prompt.

Additional Examples

An example system comprises: a processor; and a computer-readable medium storing instructions that are operative upon execution by the processor to: receive a first electronic document associated with a first source; dynamically generate, from the first electronic document, a plurality of topic-specific prompts using a plurality of ML models, each of the ML models of the plurality of ML models being differently-trained to identify a different specific topic within text; receive, for each topic-specific prompt of the plurality of topic-specific prompts, a response passage; dynamically generate a language model prompt using CRM data associated with the first source, enterprise suite data associated with the first source, and the response passages for the plurality of topic-specific prompts; and dynamically generate an output text using a language model and the language model prompt.

An example computer-implemented method comprises: receiving a first electronic document associated with a first source across a computer network; dynamically generating, from the first electronic document, a plurality of topic-specific prompts using a plurality of ML models, each of the ML models of the plurality of ML models being differently-trained to identify a different specific topic within text; receiving, for each topic-specific prompt of the plurality of topic-specific prompts, a response passage; dynamically generating a language model prompt using CRM data associated with the first source, enterprise suite data associated with the first source, and the response passages for the plurality of topic-specific prompts; and dynamically generating an output text using a language model and the language model prompt.

One or more example computer storage devices have computer-executable instructions stored thereon, which, on execution by a computer, cause the computer to perform operations comprising: receiving a first electronic document, comprising a first email, associated with a first source across a computer network; dynamically generating, from the first electronic document, a plurality of topic-specific prompts using a plurality of ML models, each of the ML models of the plurality of ML models being differently-trained to identify a different specific topic within text; receiving, for each topic-specific prompt of the plurality of topic-specific prompts, a response passage; dynamically generating a language model prompt using CRM data associated with the first source, enterprise suite data associated with the first source, and the response passages for the plurality of topic-specific prompts; and dynamically generating an output text using a language model and the language model prompt.

Alternatively, or in addition to the other examples described herein, examples include any combination of the following:

transmitting the output text across the computer network;

prior to transmitting the output text, verifying, with an RAI service that the output text passes RAI criteria;

displaying the plurality of topic-specific prompts in a UI;

displaying the output text in the UI;

annotating the output text, in the UI, to indicate elements in the output text having traceability to an associated input source;

based on at least receiving a selection of an annotation of the output text in the UI, displaying at least a portion of the associated input source or an identification of the associated input source;

the associated input source comprises an input source selected from the list consisting of: a response passage to a topic-specific prompt, an email thread comprising the first electronic document, CRM data, and enterprise suite data;

annotating the output text comprises highlighting the elements in the output text with differing colors;

each of the differing colors of the highlighting corresponds to a category of the associated input source;

identifying additional associated electronic documents that are associated with the first electronic document;

providing the first electronic document to the plurality of ML models comprises providing the first electronic document together with the additional associated electronic documents to the plurality of ML models;

the first electronic document comprises an email message;

transmitting the output text document comprises transmitting an email message;

the first source comprises an email address;

transmitting the output text comprises transmitting an email message to an email address from which the first electronic document was received;

the additional associated electronic documents together comprises a portion of an email thread;

the email thread comprises the first electronic document;

the output text extends the email thread;

providing the first electronic document to the plurality of ML models;

the different specific topics include different ones of BANT topics;

the language model prompt comprises an LLM prompt;

the language model comprises an LLM;

the language model comprises a GPT;

the language model comprises GPT-4 or chatGPT;

prior to transmitting the output text, receiving edits to the output text through the UI;

the enterprise suite data comprises calendar information;

based at least on determining, by the RAI service, that the output text does not pass RAI criteria, not transmitting the output text across the computer network;

based at least on determining, by the RAI service, that the output text does not pass RAI criteria, displaying a warning message in the UI;

training each of the ML models of the plurality of ML models to identify a different specific topic within text of a plurality of different specific topics; and the ML model training includes supervised training.

While the aspects of the disclosure have been described in terms of various examples with their associated operations, a person skilled in the art would appreciate that a combination of operations from any number of different examples is also within scope of the aspects of the disclosure.

Example Operating Environment

FIG. 9 is a block diagram of an example computing device 900 (e.g., a computer storage device) for implementing aspects disclosed herein, and is designated generally as computing device 900. In some examples, one or more computing devices 900 are provided for an on-premises computing solution. In some examples, one or more computing devices 900 are provided as a cloud computing solution. In some examples, a combination of on-premises and cloud computing solutions are used. Computing device 900 is but one example of a suitable computing environment and is not intended to suggest any limitation as to the scope of use or functionality of the examples disclosed herein, whether used singly or as part of a larger set.

Neither should computing device 900 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 900 includes a bus 910 that directly or indirectly couples the following devices: computer storage memory 912, one or more processors 914, one or more presentation components 916, input/output (I/O) ports 918, I/O components 920, a power supply 922, and a network component 924. While computing device 900 is depicted as a seemingly single device, multiple computing devices 900 may work together and share the depicted device resources. For example, memory 912 may be distributed across multiple devices, and processor(s) 914 may be housed with different devices.

Bus 910 represents what may be one or more busses (such as an address bus, data bus, or a combination thereof). Although the various blocks of FIG. 9 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 9 and the references herein to a "computing device." Memory 912 may take the form of the computer storage media referenced below and operatively provide storage of computer-readable instructions, data structures, program modules and other data for the computing device 900. In some examples, memory 912 stores one or more of an operating system, a universal application platform, or other program modules and program data. Memory 912 is thus able to store and access data 912a and instructions 912b that are executable by processor 914 and configured to carry out the various operations disclosed herein.

In some examples, memory 912 includes computer storage media. Memory 912 may include any quantity of memory associated with or accessible by the computing device 900. Memory 912 may be internal to the computing device 900 (as shown in FIG. 9), external to the computing device 900 (not shown), or both (not shown). Additionally, or alternatively, the memory 912 may be distributed across multiple computing devices 900, for example, in a virtualized environment in which instruction processing is carried out on multiple computing devices 900. For the purposes of this disclosure, "computer storage media," "computer storage memory," "memory," and "memory devices" are synonymous terms for the memory 912, and none of these terms include carrier waves or propagating signaling.

Processor(s) 914 may include any quantity of processing units that read data from various entities, such as memory 912 or I/O components 920. Specifically, processor(s) 914 are programmed to execute computer-executable instructions for implementing aspects of the disclosure. The instructions may be performed by the processor, by multiple processors within the computing device 900, or by a processor external to the client computing device 900. In some examples, the processor(s) 914 are programmed to execute instructions such as those illustrated in the flow charts discussed below and depicted in the accompanying drawings. Moreover, in some examples, the processor(s) 914 represent an implementation of analog techniques to perform the operations described herein. For example, the operations may be performed by an analog client computing device 900 and/or a digital client computing device 900. Presentation component(s) 916 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 900, across a wired connection, or in other ways. I/O ports 918 allow computing device 900 to be logically coupled to other devices including I/O components 920, some of which may be built in. Example I/O components 920 include, for example but without limitation, a microphone, joystick, game pad, satellite dish, scanner, printer, wireless device, etc.

Computing device 900 may operate in a networked environment via the network component 924 using logical connections to one or more remote computers. In some examples, the network component 924 includes a network interface card and/or computer-executable instructions (e.g., a driver) for operating the network interface card. Communication between the computing device 900 and other devices may occur using any protocol or mechanism over any wired or wireless connection. In some examples, network component 924 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 924 communicates over wireless communication link 926 and/or a wired communication link 926a to a remote resource 928 (e.g., a cloud resource) across network 930. Various different examples of communication links 926 and 926a include a wireless connection, a wired connection, and/or a dedicated link, and in some examples, at least a portion is routed through the internet.

Although described in connection with an example computing device 900, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
   a processor; and
   a computer-readable medium storing instructions that are operative upon execution by the processor to:
   receive a first electronic document associated with a first source;
   dynamically generate, from the first electronic document, a plurality of topic-specific prompts using a plurality of machine learning (ML) models, each ML model of the plurality of ML models being differently-trained to identify a different specific topic within text;
   receive, for each topic-specific prompt of the plurality of topic-specific prompts, a response passage;
   dynamically generate a language model prompt using customer relations management (CRM) data associated with the first source, enterprise suite data associated with the first source, and the response passage for the plurality of topic-specific prompts;
   dynamically generate an output text using a language model and the language model prompt;
   display the plurality of topic-specific prompts in a user interface (UI);
   display the output text in the UI; and annotate the output text in the UI to indicate elements in the output text having traceability to an associated input source.

2. The system of claim 1, wherein the instructions are further operative to:

transmit the output text across a computer network.

3. The system of claim 1, wherein the instructions are further operative to:

prior to transmitting the output text, verify, with a responsible artificial intelligence (RAI) service that the output text passes RAI criteria.

4. The system of claim 1, wherein the instructions are further operative to:

based on at least receiving a selection of an annotation of the output text in the UI, display at least a portion of the associated input source or an identification of the associated input source.

5. The system of claim 4, wherein the associated input source comprises an input source selected from a list consisting of:

a response passage to a topic-specific prompt, an email thread comprising the first electronic document, CRM data, and enterprise suite data.

6. The system of claim 4, wherein annotating the output text comprises highlighting the elements in the output text with differing colors, wherein each of the differing colors of the highlighting corresponds to a category of the associated input source.

7. The system of claim 1, wherein the instructions are further operative to:

identify additional associated electronic documents that are associated with the first electronic document, wherein providing the first electronic document to the plurality of ML models comprises providing the first electronic document together with the additional associated electronic documents to the plurality of ML models.

8. A computer-implemented method comprising:

receiving a first electronic document associated with a first source across a computer network;

dynamically generating, from the first electronic document, a plurality of topic-specific prompts using a plurality of machine learning (ML) models, each ML model of the plurality of ML models being differently-trained to identify a different specific topic within text;

receiving, for each topic-specific prompt of the plurality of topic-specific prompts, a response passage;

dynamically generating a language model prompt using customer relations management (CRM) data associated with the first source, enterprise suite data associated with the first source, and the response passages for the plurality of topic-specific prompts;

dynamically generating an output text using a language model and the language model prompt;

displaying the plurality of topic-specific prompts in a user interface (UI);

displaying the output text in the UI; and annotating the output text in the UI to indicate elements in the output text having traceability to an associated input source.

9. The computer-implemented method of claim 8, further comprising:

transmitting the output text across the computer network.

10. The computer-implemented method of claim 8, further comprising:

prior to transmitting the output text, verifying, with a responsible artificial intelligence (RAI) service that the output text passes RAI criteria.

11. The computer-implemented method of claim 8, further comprising:

based on at least receiving a selection of an annotation of the output text in the UI, displaying at least a portion of the associated input source or an identification of the associated input source.

12. The computer-implemented method of claim 11, wherein the associated input source comprises an input source selected from a list consisting of:

a response passage to a topic-specific prompt, an email thread comprising the first electronic document, CRM data, and enterprise suite data.

13. The computer-implemented method of claim 11, wherein annotating the output text comprises highlighting the elements in the output text with differing colors, wherein each of the differing colors of the highlighting corresponds to a category of the associated input source.

14. The computer-implemented method of claim 8, further comprising:

identifying additional associated electronic documents that are associated with the first electronic document, wherein providing the first electronic document to the plurality of ML models comprises providing the first electronic document together with the additional associated electronic documents to the plurality of ML models.

15. A computer storage device having computer-executable instructions stored thereon, which, on execution by a computer, cause the computer to perform operations comprising:

receiving a first electronic document, comprising a first email, associated with a first source across a computer network;

dynamically generating, from the first electronic document, a plurality of topic-specific prompts using a plurality of machine learning (ML) models, each ML model of the plurality of ML models being differently-trained to identify a different specific topic within text;

receiving, for each topic-specific prompt of the plurality of topic-specific prompts, a response passage;

dynamically generating a language model prompt using customer relations management (CRM) data associated with the first source, enterprise suite data associated with the first source, and the response passages for the plurality of topic-specific prompts;

dynamically generating an output text using a language model and the language model prompt;

displaying the plurality of topic-specific prompts in a user interface (UI);

displaying the output text in the UI; and annotating the output text in the UI to indicate elements in the output text having traceability to an associated input source.

16. The computer storage device of claim 15, wherein the operations further comprise:

transmitting, across the computer network, the output text as a second email.

17. The computer storage device of claim 15, wherein the operations further comprise:

based on at least receiving a selection of an annotation of the output text in the UI, displaying at least a portion of the associated input source or an identification of the associated input source.

18. The computer storage device of claim 17, wherein the associated input source comprises an input source selected from a list consisting of:

a response passage to a topic-specific prompt, an email thread comprising the first electronic document, CRM data, and enterprise suite data.

19. The computer storage device of claim 17, wherein annotating the output text comprises highlighting the elements in the output text with differing colors, wherein each of the differing colors of the highlighting corresponds to a category of the associated input source.

20. The computer storage device of claim 15, wherein the operations further comprise:

identifying additional associated electronic documents that are associated with the first electronic document, wherein providing the first electronic document to the plurality of ML models comprises providing the first electronic document together with the additional associated electronic documents to the plurality of ML models.

\*    \*    \*    \*    \*